US008698417B2

(12) United States Patent
Higuchi

(10) Patent No.: US 8,698,417 B2
(45) Date of Patent: Apr. 15, 2014

(54) LIGHTING DEVICE

(75) Inventor: Masanao Higuchi, Handa (JP)

(73) Assignee: Denso Corporation, Kariya (JP)

( * ) Notice: Subject to any disclaimer, the term of this patent is extended or adjusted under 35 U.S.C. 154(b) by 335 days.

(21) Appl. No.: 13/199,627

(22) Filed: Sep. 6, 2011

(65) Prior Publication Data

US 2012/0056562 A1 Mar. 8, 2012

(30) Foreign Application Priority Data

Sep. 8, 2010 (JP) ................................. 2010-201314

(51) Int. Cl.
*H05B 37/02* (2006.01)

(52) U.S. Cl.
USPC ......... 315/294; 315/299; 315/362; 315/185 R

(58) Field of Classification Search
USPC .............. 315/185 R, 291, 294, 299, 302, 362
See application file for complete search history.

(56) References Cited

U.S. PATENT DOCUMENTS

| 6,351,079 B1 * | 2/2002 | Willis ....................... 315/200 A |
| 7,511,435 B2 * | 3/2009 | Ye et al. ........................ 315/291 |
| 2002/0047596 A1 * | 4/2002 | Guthrie et al. ............ 315/200 A |

FOREIGN PATENT DOCUMENTS

| JP | 64-16435 | 1/1989 |
| JP | 2002-299695 | 10/2002 |
| JP | 2004-96032 | 3/2004 |
| JP | 2004-345590 | 12/2004 |
| JP | 2009-038400 | 2/2009 |

OTHER PUBLICATIONS

Office Action mailed Jul. 24, 2012 in corresponding Japanese Application No. 2010-201314 with English translation.

* cited by examiner

*Primary Examiner* — Thuy Vinh Tran
(74) *Attorney, Agent, or Firm* — Harness, Dickey & Pierce, PLC

(57) ABSTRACT

A lighting device includes first and second power source lines supplied with a driving current, first and second switching portions that respectively allow or prohibit supply of the driving current to the first and second power source lines, first and second current application lines respectively coupled with the first and second power source lines, first and second light-emitting element groups respectively disposed on the first and second current application lines, a driving portion coupled with the first and second current application lines and allowing flow of the driving current to the first and second current application lines, and a control portion that controls the first and second switching portions and the driving portion.

5 Claims, 5 Drawing Sheets

LIGHTING DEVICE

CROSS REFERENCE TO RELATED APPLICATIONS

The present application is based on and claims priority to Japanese Patent Applications No. 2010-201314 filed on Sep. 8, 2010, the contents of which are incorporated in their entirety herein by reference.

TECHNICAL FIELD

The present invention relates to a lighting device including a light-emitting element and a current application line that applies a driving current to the light-emitting element.

BACKGROUND

In a conventional art, an indicating part in a display instrument is lighted so that the indicating part is visible even in a state where light from the outside is weak. The conventional art includes, for example, a display instrument for a vehicle disclosed in JP-A-2004-345590 (hereafter, referred to as a patent document No. 1). The display instrument for a vehicle includes a plurality of light-emitting diodes and an LED circuit. The light-emitting diodes light an indicating part. The LED circuit is coupled with a power source and applies a driving current for activating the light-emitting diodes to the light-emitting diodes. The display instrument further includes a transistor coupled with the LED circuit and a switch control circuit that controls supply of the driving current to the light-emitting diodes by the transistor.

In the display instrument, the switch control circuit can apply the driving current from the power source to the light-emitting diodes by controlling the transistor. Accordingly, the light-emitting diodes emit light.

A configuration of an indicating part in a display instrument is increasingly complicated. The number of light-emitting diodes for lighting the indicating part increases with an increasingly complicated indicating part. The number of LED circuits and the transistors for activating a large number of light-emitting diodes also increase. Thus, a configuration of a lighting device is increasingly complicated.

In some lighting device, light-emitting diodes need to emit light alternately. However, in the configuration described in the patent document No. 1, the light-emitting diodes are activated or deactivated simultaneously when the switch control circuit controls each of the transistors. Thus, the configuration described in the patent document No. 1 may activate the light-emitting diodes inappropriately.

SUMMARY

In view of the foregoing problems, it is an object of the present invention to provide a lighting device that can appropriately light an indicating part in a display instrument.

A lighting device according to an aspect of the present invention is a lighting device for lighting an indicating part in a display instrument, and the lighting device includes a first power source line, a second power source line, a first switching portion, a second switching portion, a first current application line, a first light-emitting element group, a second current application line, a second light-emitting element group, a driving portion, and a control portion. The first power source line and the second power source line are supplied with a driving current. The first switching portion allows or prohibits supply of the driving current to the first power source line. The second switching portion allows or prohibits supply of the driving current to the second power source line. The first current application line is coupled with the first power source line. The first light-emitting element group includes at least one light-emitting element and is disposed on the first current application line. The second current application line is coupled with the second power source line. The second light-emitting element group includes at least one light-emitting element and is disposed on the second current application line. The driving portion is coupled with the first current application line and the second current application line and allows flow of the driving current to the first current application line and the second application line. The control portion controls the first switching portion, the second switching portion, and the driving portion.

In the above-described lighting device, the driving portion is shared by the first current application line and the second application line. Thus, the lighting device can have a simple configuration. In addition, because the first light-emitting element group and the second light-emitting element group which are alternately activated are disposed separately on the first current application line and the second application line, the lighting device can appropriately activate the first light-emitting element group and the second light-emitting element group by controlling the flow of the driving current to the first current application line and the second current application line using the control portion.

BRIEF DESCRIPTION OF THE DRAWINGS

Additional objects and advantages of the present invention will be more readily apparent from the following detailed description when taken together with the accompanying drawings. In the drawings.

DETAILED DESCRIPTION

First Embodiment

Figure 1:
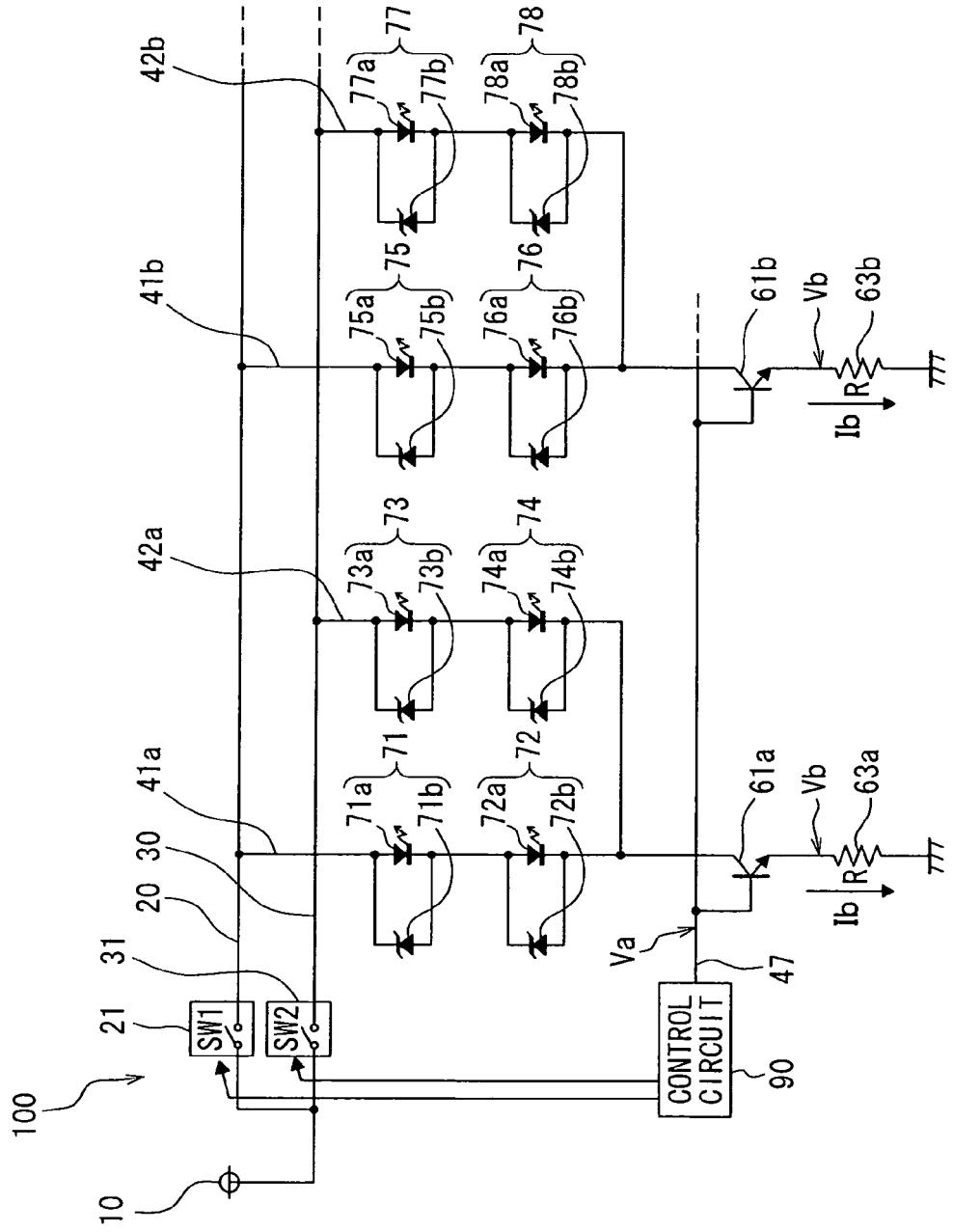
FIG. 1 is a circuit diagram showing a lighting device according to a first embodiment.

A lighting device 100 according to a first embodiment will be described with reference to FIG. 1. The lighting device 100 can be suitably used, for example, as a device for lighting a display instrument such as a combined instrument disposed in a vehicle. The lighting device 100 lights an indicating part in the combined instrument so that the indicating part is visible even in a state where light from the outside is weak. The indicating part includes, for example, indicators, scales, letters, and figures.

The lighting device 100 includes a first power source line 20, a second power source line 30, switches 21, 31, current application lines 41*a*, 41*b*, 42*a*, 42*b*, transistors 61*a*, 61*b*, resistors 63*a*, 63*b*, a control line 47, light-emitting elements 71-78, and a control circuit 90. In addition, the lighting device 100 further includes a plurality of current application lines, a plurality of transistors, a plurality of resistors, and a plurality of light-emitting elements which are not shown in FIG. 1.

The first power source line 20 and the second power source line 30 are coupled with the lighting source 10. The first power source line 20 is coupled with current application lines 41a, 41b, and the second power source line 30 is coupled with the current application lines 42a, 42b. The first power source line 20 and the second power source line 30 are supplied with a driving current from the lighting source 10. The lighting source 10 is, for example, a part of a power source circuit in the combined instrument. The lighting source 10 converts electric power stored in a battery equipped in the vehicle to a state appropriate to the lighting device 100 and supplies to the first power source line 20 and the second power source line 30.

The switch 21 (SW1) is disposed on the first power source line 20 and allows or prohibits supply of the driving current to the first power source line 20. In other words, the switch 21 changes an on-off state of the first power source line 20. The switch 31 (SW2) is disposed on the second power source line 30 and allows or prohibits supply of the driving current to the second power source line 30. In other words, the switch 31 changes an on-off state of the second power source line 30. Each of the switch 21 and the switch 31 is a switching portion such as a relay and is coupled with the control circuit 90. The switch 21 and the switch 31 change the on-off states of the first power source line 20 and the second power source line 30 based on control signals from the control circuit 90.

The current application lines 41a, 41b, 42a, 42b supply the driving current to each of the light-emitting elements 71-78 so that each of the light-emitting elements 71-78 emits light. The current application lines 41a, 41b are coupled with the first power source line 20 on the opposite side of the switch 21 from the lighting source 10. The current application lines 42a, 42b are coupled with the second power source line 30 on the opposite side of the switch 31 from the lighting source 10. The light-emitting elements 71, 72 are coupled in series and are disposed on the current application line 41a. The light-emitting elements 73, 74 are coupled in series and are disposed on the current application line 42a. The light-emitting elements 75, 76 are coupled in series and are disposed on the current application line 41b. The light-emitting elements 77, 78 are coupled in series and are disposed on the current application line 42b.

Each of the transistors 61a, 61b is an NPN transistor. In the transistor 61a, an emitter is coupled with the resistor 63a, a collector is coupled with the current application line 41a and the current application line 42a, and a base is coupled with the control circuit 90 through the control line 47. In the transistor 61b, an emitter is coupled with the resistor 63b, a collector is coupled with the current application line 41b and the current application line 42b, and a base is coupled with the control circuit 90 through the control line 47. Each of the bases of the transistors 61a, 61b receives a rectangular pulse signal from the control circuit 90. The transistors 61a, 61b are intermittently driven by the pulse signal from the control circuit 90 and allow flow of the driving current to each of the current application lines 41a, 41b, 42a, 42b.

Each of the resistors 63a, 63b is a passive element having a predetermined resistance R. One end of the resistor 63a is coupled with the transistor 61a and the other end is coupled with the ground. The resistor 63a defines an intensity of electric current that flows to the transistor 61a. One end of the resistor 63b is coupled with the transistor 61b and the other end is coupled with the ground. The resistor 63b defines an intensity of electric current that flows to the resistor 61b.

The control line 47 couples the control circuit 90 and each of the transistors 61a, 61b. The control line 47 is applied with a voltage Va from the control circuit 90. When the voltage Va applied to the control line 47 is determined, a voltage Vb applied to the resistor 63a and the resistor 63b is determined. Accordingly electric current Ib=Vb/R having substantially the same intensity flows to the resistor 63a and the transistor 61a and the resistor 63b and the transistor 61b. Thus, the lighting device 100 is a constant current circuit in which the driving current having a constant intensity is applied to each of the light-emitting elements 71-78.

The light-emitting elements 71-78 lights the indicating part in the combined instrument. The light-emitting elements 71, 72, 75, 76 and the light-emitting elements 73, 74, 77, 78 alternately emit light. Specifically, when the light-emitting elements 71, 72, 75, 76 are activated, the light-emitting elements 73, 74, 77, 78 are deactivated. In contrast, when the light-emitting elements 73, 74, 77, 78 are activated, the light-emitting elements 71, 72, 75, 76 are deactivated.

The light-emitting elements 71-78 respectively include light-emitting diodes 71a-78a and zener diodes 71b-78b. Each of the light-emitting diodes 71a-78a emit light when the driving current flows in a forward direction from the first power source line 20 toward the transistor 61a or transistor 61b or when the driving current flows in a forward direction from the second power source line 30 toward the transistor 61a or the transistor 61b. Each of the light-emitting diodes 71a-78a is intermittently applied with the driving current by the transistors 61a, 61b which are intermittently driven.

The zener diodes 71b-78b are respectively coupled in parallel with the light-emitting diodes 71a-78a. Each of the zener diodes 71b-78b allows flow of electric current in a reverse direction of the forward direction. Thus, each of the light-emitting elements 71-78 allows flow of electric current in the reverse direction. Because the light-emitting elements 71-78 include the zener diodes 71b-78b, the light-emitting diodes 71a-78b are less likely to be damaged due to, for example, static electricity. Furthermore, because the reliability of the light-emitting elements 71-78 is improved, the lighting device 100 can appropriately light the indicating part for a long term.

The control circuit 90 includes a microcomputer for performing various calculations and a pulse generation circuit for generating the pulse signal. The control circuit 90 is coupled with the switches 21, 31 and the transistors 61a, 61b. The control circuit 90 controls switching of the on-off states of the first power source line 20 and the second power source line 30 by the switches 21, 31. The microcomputer calculates a pulse width of the pulse signal input to each of the transistors 61a, 61b. The pulse generation circuit generates the rectangular pulse signal having the pulse width calculated by the microcomputer and outputs the rectangular pulse signal to each of the transistors 61a, 61b. The control circuit 90 can increase and decrease a time for which each of the transistors 61a, 61b enables each current application line to be an electrically connected state by changing the pulse width of the pulse signal input to each of the transistors 61a, 61b. Accordingly, the control circuit 90 can control a time for which each of the light-emitting elements 71-78 emits light and can control brightness of each of the light-emitting elements 71-78. As described above, the control circuit 90 controls the flow of the driving current to each of the current application lines 41, 41b, 42a, 42b with the transistors 61a, 61b.

An operation of the lighting device 100 according to the present embodiment will be described below.

First, a case in which the light-emitting elements 71, 72 disposed on the current application line 41a and the light-emitting elements 75, 76 disposed on the current application line 41b are activated will be described. The control circuit 90 controls the switch 21 so as to allow supply of the driving current from the lighting source 10 to the first power source line 20. In addition, the control circuit 90 controls the switch 31 so as to prohibit supply of the driving current from the lighting source 10 to the second power source line 30. In the above-described state, the control circuit 90 outputs the pulse signal to the transistors 61a, 61b so as to allow flow of the driving current to each of the current application lines 41a, 41b, 42a, 42b.

Because the first power source line 20 is in the on-state, the driving current flows in the electric application lines 41a, 41b coupled with the first power source line 20. Accordingly, the light-emitting elements 71, 72, 75, 76 disposed on the current application lines 41a, 41b are applied with the driving current. Then, the light-emitting elements 71, 72, 75, 76 emit light to light the indicating part in the combined instrument.

Next, a case in which the light-emitting elements 73, 74 disposed on the current application line 42a and the light-emitting elements 77, 78 disposed on the current application line 42b are activated will be described. The control circuit 90 controls the switch 21 so as to prohibit supply of the driving current from the lighting source 10 to the first power source line 20. In addition, the control circuit 90 controls the switch 31 so as to allow supply of the driving current from the lighting source 10 to the second power source line 30. In the above-described state, the control circuit 90 outputs the pulse signal to the transistors 61a, 61b so as to allow flow of the driving current to each of the current application lines 41a, 41b, 42a, 42b.

Because the second power source line 30 is in the on-state, the driving current flows in the electric application lines 42a, 42b coupled with the second power source line 30. Accordingly, the light-emitting elements 73, 74, 77, 78 disposed on the current application lines 42a, 42b are applied with the driving current. Then, the light-emitting elements 73, 74, 77, 78 emit light to light the indicating part in the combined instrument.

In the present embodiment, the transistor 61a is shared by the current application lines 41a, 42a. In addition, the transistor 61b is shared by the current application lines 41b, 42b. Because a plurality of current application lines shares a transistor, the lighting device 100 can have a simple configuration.

In addition, in the lighting device 100, the light-emitting elements to be activated alternately are disposed separately on the current application lines 41a, 41b coupled with the first power source line 20 and the current application lines 42a, 42b coupled with the second power source line 30. Then, by switching the on-off states of the first power source line 20 and the second power source line 30 by the control circuit 90, the lighting device 100 can appropriately activate the light-emitting elements to emit light. Thus, the lighting device 100 can appropriately light the indicating part in the combined instrument.

Therefore, the lighting device 100 that can appropriately light the indicating part and that has a simple configuration can be provided.

In the present embodiment, the switch 21 can operate as a first switching portion, the switch 31 can operate as a second switching portion, each of the current application lines 41a, 41b can operate as a first current application line, each of the current application lines 42a, 42b can operate as second current application line. Each of the transistors 61a, 61b can operate as a driving portion and a first driving portion, each of the light-emitting elements 71, 72, 75, 76 can operate as a light-emitting element in a first light-emitting element group, each of the light-emitting elements 73, 74, 77, 78 can operate as a light-emitting element in a second light-emitting element group, each of the zener diodes 71b-78b can operate as a protection diode, and the control circuit 90 can operate as a control portion.

Second Embodiment

Figure 2:
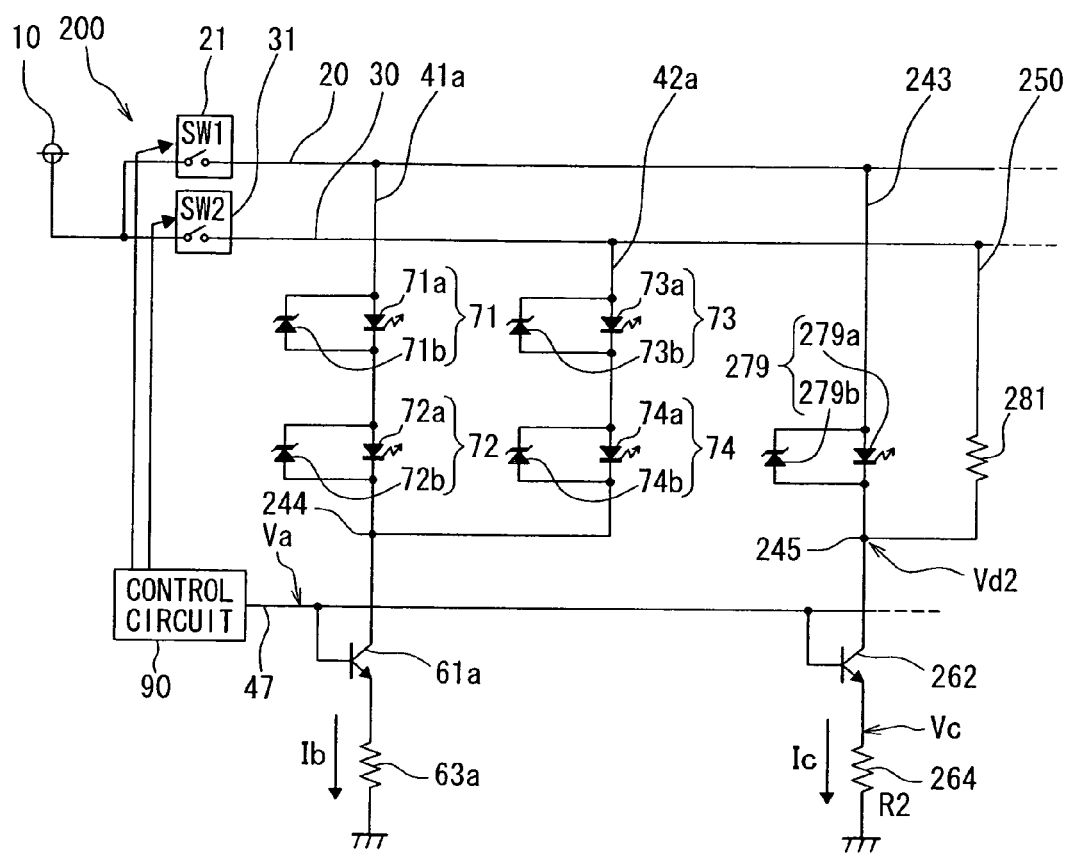
FIG. 2 is a circuit diagram showing a lighting device according to a second embodiment.

A lighting device 200 according to a second embodiment will be described with reference to FIG. 2. The lighting device 200 includes a current application line 243, a transistor 262, a resistance line 250, a resistor 264, a resistor 281, and a light-emitting element 279 in addition to the configuration of the lighting device 100 according to the first embodiment. The current application lines 41b, 42b, the light-emitting elements 75-78, the transistor 61b, and the resistor 63b described in the first embodiment are not shown in FIG. 2 for the sake of simplification.

The current application line 243 is one of a plurality of current application lines included in the lighting device 200. In the current application line 243, the light-emitting element 279 is disposed. The current application line 243 is a line for applying the driving current to the light-emitting element 279. The current application line 243 is coupled with the first power source line 20 on the opposite side of the switch 21 from the lighting source 10.

The transistor 262 is an NPN transistor similar to the transistors 61a, 61b described in the first embodiment. In the transistor 262, an emitter is coupled with the resistor 264, a collector is coupled with the current application line 243, and a base is coupled with the control circuit 90 through the control line 47. The base of the transistor 262 receives a rectangular pulse signal from the control circuit 90. The transistor 262 is driven by the pulse signal input from the control circuit 90 to the base and allows supply of the driving current to the current application line 243 and the resistance line 250.

The resistance line 250 is coupled with the second power source line 30 on the opposite side of the switch 31 from the lighting source 10. The resistance line 250 couples a cathode portion 245 of the current application line 243 located between the light-emitting element 279 and the transistor 262 with the second power source line 30. In the resistor line 250, the resistor 281 is disposed. The resistor 281 is a passive element having a predetermined resistance. In the present embodiment, the resistance of the resistor 281 is set to be lower than a combined resistance of the light-emitting elements 73, 74 disposed on the current application line 42a.

The resistor 264 is a passive element having a predetermined resistance R2. One end of the resistor 264 is coupled with the transistor 262 and the other end is coupled with the ground. The resistor 264 defines an intensity of electric current that flows to the transistor 262. A voltage Vc applied to the resistor 264 depends on a voltage Va applied to the control line 47. In the resistor 264 and the transistor 262, electric current Ic=Vc/R2 flows. The intensity of the electric current Ic is substantially equal to the intensity of the electric current Ib that flows in the transistor 61a and the resistor 63a. Thus, the lighting device 200 is a constant current circuit in which the driving current having a constant intensity is applied to each of the light-emitting elements 71-74, 279.

The light-emitting element 270 lights the indicating part in the combined instrument in a manner similar to the light-emitting elements 71-74. The light-emitting element 279 includes a light-emitting diode 279a and a zener diode 279b. The light-emitting element 279 emits light when applied with the driving current in a forward direction from the first power source line 20 toward the transistor 262. The light-emitting element 279 is intermittently applied with the driving current by the transistor 262 which is intermittently driven. The zener diode 279b is coupled in parallel with the light-emitting diode 279a and allows flow of electric current in the reverse direction. Because the light-emitting element 279 includes the zener diode 279b, the light-emitting diode 279a is less likely to be damaged due to, for example, static electricity.

Figure 3:
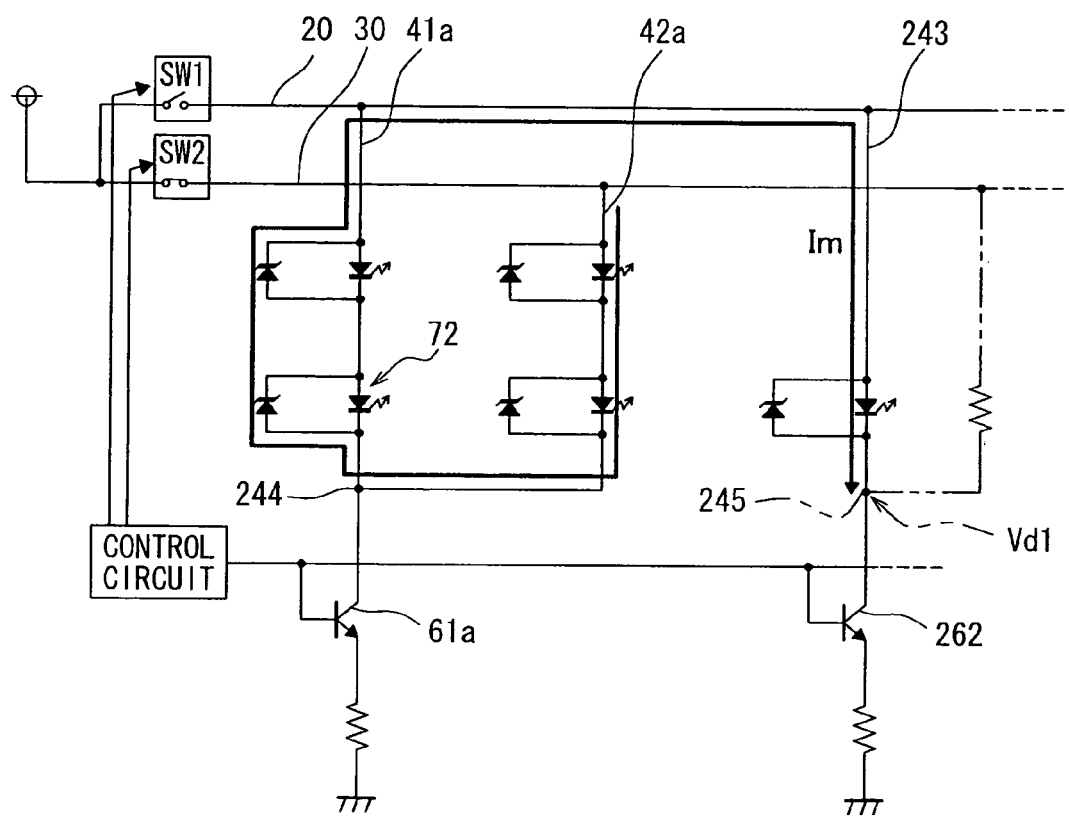
FIG. 3 is a circuit diagram showing a lighting device according to a comparative example.

In the present embodiment, the transistor 262 is coupled with the second power source line 30 through the resistance line 250. In a comparative example shown in FIG. 3, the transistor 262 is not coupled with the second power source line 30. In the configuration according to the comparative example, when the first power source line 20 is in the off-state and the second power source line 30 is in the on-state, a part of the driving current that flows in the second power source line 30 and the current application line 42a in order may flow to the current application line 243 through the current application line 41a and the first power source line 20 (hereafter, referred to as a round electric current Im). The round electric current Im is caused because a voltage Vd1 at the cathode portion 245 of the current application line 243 is lower than a voltage at a connection portion 244 of the current application line 41a located between the light-emitting element 72 and the transistor 61a and coupled with current application line 42a.

Thus, the lighting device 200 according to the present embodiment includes the resistance line 250 in which the resistor 281 is disposed. Because the resistance line 250 couples the cathode portion 245 of the current application line 243 with the second power-source line 30, when the first power source line 20 is in the off-state and the second power source line 30 is in the on-state, electric current flows to the transistor 262 and the resistor 264. Thus, a voltage Vd2 at the cathode portion 245 becomes higher than the voltage Vd1 (shown in FIG. 3) at the cathode portion 245 in the configuration without the resistance line 250. In this way, the voltage Vd2 at the cathode portion 245 can be higher than the voltage at the connection portion 244 of the current application line 41a when the first power source line 20 is in the off-state and the second power source line 30 is in the on-state. Accordingly, generation of the round electric current Im through the first power source line 20 can be restricted, and the light-emitting element 279 is less likely to emit light due to the round electric current Im. Therefore, the lighting device 200 can appropriately light the indicating part even with a simple configuration.

The resistance of the resistor 281 is lower than the combined resistance of the light-emitting elements 73, 74. When the first power source line 20 is in the off-state and the second power source line 30 is in the on-state, a voltage applied to the resistor 231 is lower than a voltage applied to the light-emitting elements 73, 74. Thus, the voltage Vd2 at the cathode portion 245 of the current application line 243 is certainly higher than the voltage at the connection portion 244 of the current application line 41a. Accordingly, the round electric current Im through the first power source line 20 can be restricted with certainty, and the light-emitting element 279 is much less likely to emit light due to the round electric current Im. Therefore, the lighting device 200 can appropriately light the indicating part even with a simple configuration.

In the present embodiment, each of the light-emitting elements includes a zener diode that allows flow of electric current in the reverse direction. Thus, the round flow of the driving current through the first power source line 20 may be generated. However, as described above, because the resistance line 250 couples the cathode portion 245 with the second power source line 30, generation of the round electric current Im can be restricted. Thus, the lighting device 200 can appropriately light the indicating part with certainty.

In the present embodiment, the current application line 243 can operate as a third current application line, the transistor 262 can operate as a second driving portion, the light-emitting element 279 can operate as a light-emitting element in a third light-emitting element group, and the resistor 281 can operate as a first resistor.

Third Embodiment

Figure 4:
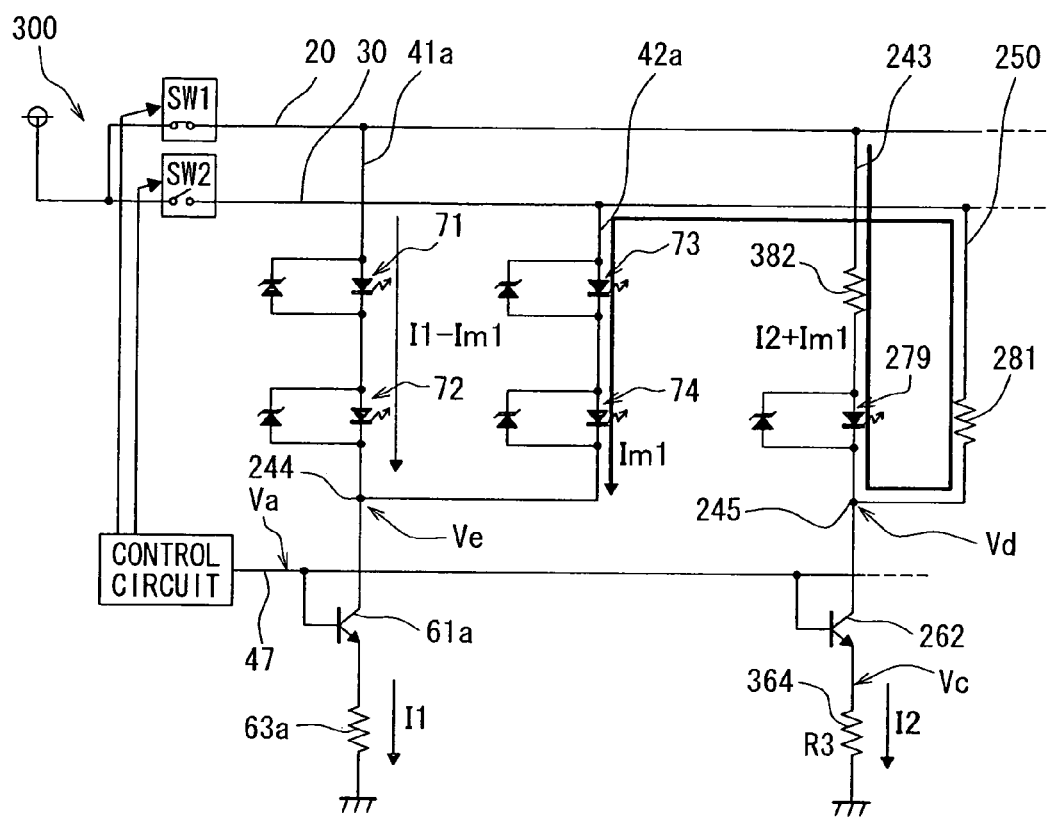
FIG. 4 is a circuit diagram showing a lighting device according to a third embodiment in a state where round electric current Im1 flows.
Figure 5:
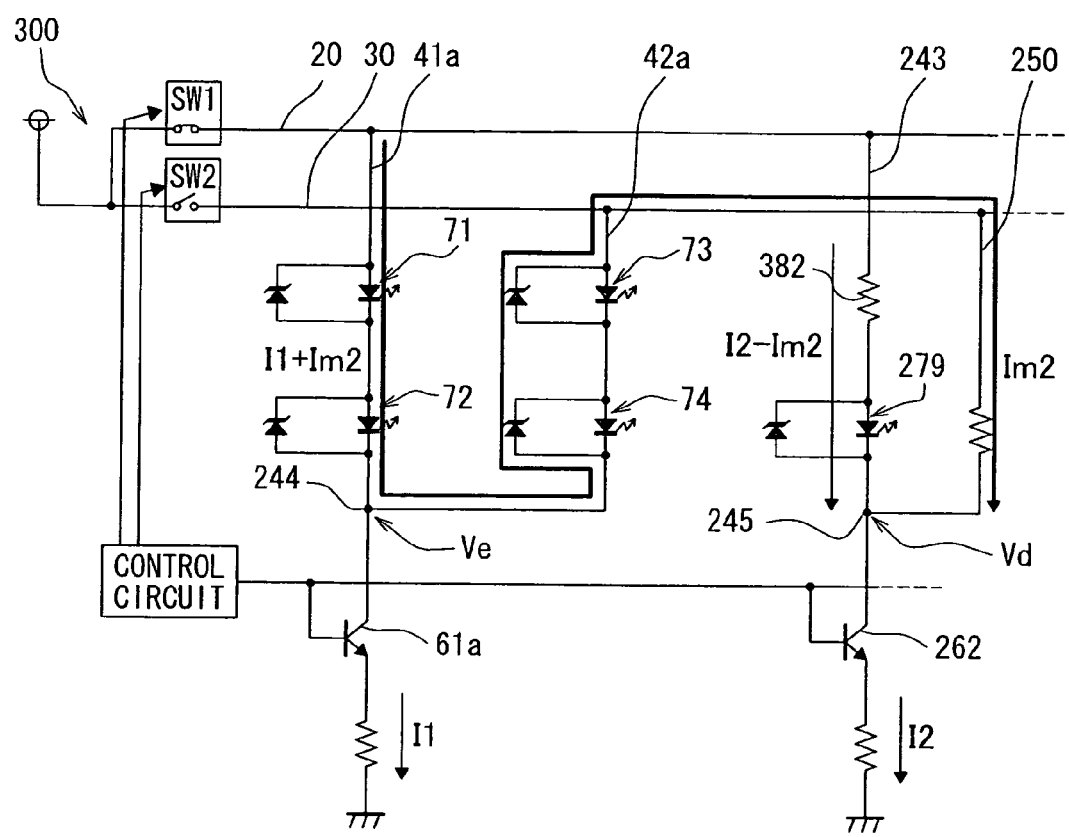
FIG. 5 is a circuit diagram showing the lighting device according to the third embodiment in a state where round electric current Im2 flows.

A lighting device 300 according to a third embodiment will be described with reference to FIG. 4 and FIG. 5. In the configuration according to the second embodiment, when the first power source line 20 is in the on-state and the second power source line 30 is in the off-state, a part of the driving current that flows in the current application line 243 may flow to the current application line 42a through the resistance line 250 and the second power source line (hereafter, referred to as a round electric current Im1) as shown in FIG. 4. The round electric current Im1 is caused because a voltage Vd at the cathode portion 245 of the current application line 243 coupled with the resistance line 250 is different from a voltage Ve at a connection portion 244 of the current application line 41a coupled with the current application line 42a.

Also the lighting device 300 is a constant current circuit in which the driving current having a constant intensity is applied to each of the light-emitting elements 71-74, 279. The lighting device 300 includes a resistor 364 having a predetermined resistance R3 as a component corresponding to the resistor 264 in the second embodiment. A voltage Vc applied to the resistor 364 depends on the voltage Va applied to the control line 47. In the resistor 364 and the transistor 262, electric current I2=Vc/R3 flows. The intensity of the electric current I2 is substantially equal to the intensity of the electric current I1 that flows in the transistor 61a and the resistor 63a.

If the round electric current Im1 flows from the current application line 243 to the current application line 41a through the second power source line 30, the driving current that flows in the current application line 243 is I2+Im1. Thus, the driving current that flows in the current application line 243 is greater than the electric current I2 that flows in the transistor 262 by the intensity of the round electric current Im1.

Moreover, if the round electric current Im1 through the second power source line 30 is caused, the electric current that flows in the current application line 41a is I1-Im1. Thus, the driving current that flows in the current application line 41a is less than the electric current I1 that flows in the transistor 61a by the intensity of the round electric current Im1. Accordingly, the light-emitting elements 71, 72 and the light-emitting element 279 may not emit light with appropriate brightness.

In view of the above-described issue, the lighting device 300 according to the present embodiment further includes a resistor 382 on the current application line 243. The resistor 382 is a passive element having a predetermined resistance. The resistor 382 is coupled in series with the light-emitting element 279. A combined resistance of the light-emitting element 279 and the resistor 382 on the current application line 243 is lower than the combined resistance of the light-emitting element 71 and the light-emitting element 72 on the current application line 41a. By disposing the resistor 382, the round electric current Im1 can be restricted as follows.

By disposing the resistor 382 on the current application line 243, the voltage Vd at the cathode portion 245 of the current application line 243 can be controlled with the resistance of the resistor 382. Thus, when the first power source line 20 is in the on-state and the second power source line 30 is in the off-state, a difference between the voltage Vd at the cathode portion 245 of the current application line 243 and the voltage Ve at the connection portion 244 of the current application line 41a can be reduced. Accordingly, generation of the round electric current Im1 through the second power source line 30 can be restricted. Therefore, the light-emitting elements 71, 72 and the light-emitting element 279 can emit light with substantially equal brightness.

If the combined resistance of the light-emitting elements 71, 72 is lower than the combined resistance of the combined resistance of the light-emitting element 279 and the resistor 382 due to manufacturing variations, the voltage Vd at the cathode portion 245 of the current application line 243 becomes lower than the voltage V3 at the connection portion 244 of the current application line 41a. Then, a part of the driving current that flows in the current application line 41a may flow to the resistance line 250 through the current application line 42a and the second power source line 30 as a round electric current Im2 (see FIG. 5).

As described above, the driving current I1, I2 having substantially equal intensity flow to the transistor 61a and the transistor 262. If the round electric current Im2 flows from the current application line 41a to the current application line 243 through the second power source line 30, the driving current that flows in the current application 41a is I1+Im2, and the driving current that flows in the current application line 41a is greater than the electric current I1 that flows in the transistor 61a by the intensity of the round electric current Im2.

Moreover, if the round electric current Im2 flows, the driving current that flow in the current application line 243 is I2-Im2, and the driving current that flows in the current application line 243 is less than the electric current I2 that flows in the transistor 262 by the intensity of the round electric current Im2. Accordingly, the light-emitting elements, 71, 72 and the light-emitting element 279 may not emit light with substantially equal brightness.

In view of above-described issue, in the present embodiment, the combined resistance of the light-emitting element 279 and the resistor 382 on the current application line 243 is set to be lower than the combined resistance of the light-emitting elements 71, 72 on the current application line 41a. Thus, even if the resistance of each light-emitting element varies, when the first power source line 20 is in the on-state and the second power source line 30 is in the off-state, the voltage Vd at the cathode portion 245 of the current application line 243 can be higher than the voltage Ve at the connection portion 244 of the current application line 41a. Therefore, generation of the round electric current Im2 through the second power source line 30 can be restricted, and the light-emitting elements 71, 72 and the light-emitting element 279 can emit light with substantially equal brightness.

Therefore, the lighting device 300 according to the present embodiment can appropriately light the indicating part even with a simple configuration.

The round electric current Im1, Im2 can be reduced by increasing the resistance of the resistor 281 disposed on the resistance line 250. When the resistance of the resistor 281 is increased, the round electric current Im1, Im2 are less likely to flow in the resistance line 250. Thus, even when there is a difference between the voltage Vd at the cathode portion 245 and the voltage Ve at the connection portion 244, generation of the round electric current Im1, Im2 can be further restricted. Thus, when the lighting device 300 includes the resistor 281 having a high resistance, the lighting device 300 can light the indicating part more certainly.

Also in the present embodiment, each light-emitting element includes a zener diode that allows flow of electric current in the reverse direction. Thus, the round electric current Im1, Im2 through the first power source line 20 or the second power source line 30 may be caused. However, generation of the round electric current Im1 and the round electric current Im2 can be restricted by the resistor 281 disposed on the resistance line 250 and the resistor 382 disposed on the current application line 243. Thus, the lighting device 300 can appropriately light the indicating part with certainty.

In the present embodiment, the resistor 382 can operate as a second resistor.

Other Embodiments

Although the present invention has been fully described in connection with the above-described embodiments thereof with reference to the accompanying drawings, the present invention is not limited to the above-described embodiments, and can be applied to various modifications and combinations within a scope of the present invention.

In the second embodiment, the resistance of the resistor 281 is equal to the combined resistance of the light-emitting elements 73, 74 disposed on the current application line 42a. In the third embodiment, the resistance of the resistor 281 is set to be high for restricting generation of round electric current through the resistance line 250. In this way, the resistance of the resistor 281 disposed on the resistance line 250 can be set optionally.

In the third embodiment, the resistance of the resistor 382 disposed on the current application line 243 is set so as to restrict generation of the round electric current Im2. Specifically, in consideration of manufacturing variations, the resistance of the resistor 382 is set in such a manner that the combined resistance of the resistor 382 and the light-emitting element 279 is lower than or equal to the combined resistance of the light-emitting elements 71, 72. However, also the resistance of the resistor 382 can be set optionally in a manner similar to the resistance of the resistor 281.

In each of the above-described embodiments, each of the light-emitting elements includes the light-emitting diode and the zener diode for protecting the light-emitting diode. However, a component for protecting the light-emitting diode is not limited to the zener diode. A component corresponding to the zener diode is not essential to the light-emitting element.

In each of the above-described embodiments, the control circuit 90 includes the microcomputer for performing various calculations. The control portion that controls each switch and each transistor is not limited to the above-described control circuit 90. For example, each switch and each transistor may also be controlled by an analog circuit.

What is claimed is:

1. A lighting device for lighting an indicating part in a display instrument, the lighting device comprising:
   a first power source line and a second power source line supplied with a driving current;
   a first switching portion that allows or prohibits supply of the driving current to the first power source line;
   a second switching portion that allows or prohibits supply of the driving current to the second power source line;
   a first current application line coupled with the first power source line;
   a first light-emitting element group including at least one light-emitting element and disposed on the first current application line;

a second current application line coupled with the second power source line;

a second light-emitting element group including at least one light-emitting element and disposed on the second current application line;

a driving portion coupled with the first current application line and the second current application line, the driving portion allowing flow of the driving current to the first current application line and the second application line; and a control portion that controls the first switching portion, the second switching portion, and the driving portion; wherein the driving portion coupled with the first current application line and the second current application line is a first driving portion, the lighting device further comprising:

a third current application line coupled with the first power source line, and a third light-emitting element group including at least one light emitting element and disposed on the third current application line;

a second driving portion coupled with the third current application line and allowing flow of the driving current to the third application line;

a resistance line; and a resistor disposed on the resistance line, wherein the third current application line includes a cathode portion located between the third light-emitting element group and the second driving portion, and wherein the resistance line couples the cathode portion with the second power source line.

2. The lighting device according to claim 1,
wherein the resistor disposed on the resistance line is a first resistor, and
wherein the number of light emitting element included in the first light-emitting element group is larger than the number of light emitting element included in the third light-emitting element group,
the lighting device further comprising a second resistor disposed on the third application line and coupled in series with the third light-emitting element group.

3. The lighting device according to claim 2,
wherein the third group of light-emitting elements and the second resistor in the third current application line has a first combined resistance,
wherein the first group of light-emitting elements has a second combined resistance, and
wherein the first combined resistance is lower than the second combined resistance.

4. The lighting device according to claim 1,
wherein the resistor has a resistance lower than a combined resistance of the light-emitting elements included in the second light-emitting element group.

5. The lighting device according to claim 1,
wherein each of the light-emitting elements includes a light-emitting diode and a protection diode,
wherein the light-emitting diode emits light when applied with the driving current that flows in a forward direction from the first power source line toward the driving portion or from the second power source line toward the driving portion, and
wherein the protection diode allows flow of electric current in a reverse direction of the forward direction for protecting the light-emitting diode.

* * * * *